(12) United States Patent
Itoh et al.

(10) Patent No.: US 9,001,294 B2
(45) Date of Patent: Apr. 7, 2015

(54) LIQUID-CRYSTAL DISPLAY PANEL

(75) Inventors: Ryohki Itoh, Osaka (JP); Yuhko Hisada, Osaka (JP); Junichi Morinaga, Osaka (JP); Hironobu Sawada, Osaka (JP); Katsushige Asada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 78 days.

(21) Appl. No.: 13/881,453

(22) PCT Filed: Nov. 1, 2011

(86) PCT No.: PCT/JP2011/075172
§ 371 (c)(1),
(2), (4) Date: Apr. 25, 2013

(87) PCT Pub. No.: WO2012/063680
PCT Pub. Date: May 18, 2012

(65) Prior Publication Data
US 2013/0222746 A1    Aug. 29, 2013

(30) Foreign Application Priority Data

Nov. 9, 2010    (JP) ................................. 2010-251321

(51) Int. Cl.
*G02F 1/1335*    (2006.01)
*G02F 1/1333*    (2006.01)
(Continued)

(52) U.S. Cl.
CPC .......... *G02F 1/133514* (2013.01); *G02B 5/201* (2013.01); *G02F 1/136209* (2013.01); *G02F 2001/133354* (2013.01); *G02F 2201/52* (2013.01)

(58) Field of Classification Search
CPC .................... G02F 1/133371; G02F 1/135512; G02F 1/136209

USPC .................. 349/107, 109, 110, 106, 108, 111
See application file for complete search history.

(56) References Cited

U.S. PATENT DOCUMENTS 7,872,623 B2 *   1/2011   Chen et al. ...................... 345/87
7,916,245 B2 *   3/2011   Taguchi et al. ............... 349/109
(Continued)

FOREIGN PATENT DOCUMENTS

| JP | 2002323616 A | * | 11/2002 |
| JP | 2006-259135 A | | 9/2006 |
| JP | 2008-096549 A | | 4/2008 |

OTHER PUBLICATIONS

English translation of JP 2002323616, Author: Sofue, Masaji, Title: Color Filter, Its Manufacturing Method and Liquid Crystal Element Using the Color Filter Date: Nov. 8, 2002.*

(Continued)

*Primary Examiner* — Edward Glick
*Assistant Examiner* — Shan Liu
(74) *Attorney, Agent, or Firm* — Keating & Bennett, LLP

(57) ABSTRACT

A liquid crystal display panel includes a color filter substrate with four or more color layers of different colors and a light shielding layer, each pixel including a repeating unit composed of the four or more color layers overlap overlapping the light shielding layer, the liquid crystal display panel having a region where color layers of the same color in different pixels are arranged in the same rows or the same columns, and a color layer of a color with higher brightness overlaps a portion of the light shielding layer positioned between the color layer and another color layer of the same color with an overlapping width smaller than that with which a color layer of a color with lower brightness overlaps a portion of the light shielding layer positioned between the color layer and another color layer of the same color.

10 Claims, 11 Drawing Sheets

(51) Int. Cl.
*G02B 5/20* (2006.01)
*G02F 1/1362* (2006.01)

(56) References Cited

U.S. PATENT DOCUMENTS

2005/0030449 A1* 2/2005 Kocha et al. .................. 349/106
2008/0084376 A1 4/2008 Hirota et al.
2010/0265605 A1* 10/2010 Lee ............................... 359/891

OTHER PUBLICATIONS

Official Communication issued in International Patent Application No. PCT/JP2011/075172, mailed on Dec. 6, 2011.

* cited by examiner

LIQUID-CRYSTAL DISPLAY PANEL

TECHNICAL FIELD

The present invention relates to a liquid crystal display panel. Specifically, the present invention relates to a liquid crystal display panel provided with four or more color filters of different colors.

BACKGROUND ART

Liquid crystal display (LCD) panels control the light transmission/shutoff (switch on/off of the display) by controlling the alignment of liquid crystal molecules having birefringence, and are provided with a pair of substrates (e.g. a pair of an active matrix substrate and a color filter substrate) facing each other with a liquid crystal layer interposed therebetween.

A general color filter substrate includes a glass substrate or the like and a plurality of color filters of different colors regularly arranged on the substrate. A most common combination of colors of color filters is a combination of three primary colors, red (R), green (G), and blue (B). The color filters correspond to pixels that are units forming a color image. Also, a black matrix is formed between adjacent color filters.

Nowadays, to improve the display brightness of color liquid crystal display panels, use of color filters of four primary colors including yellow (Y) or white (W) in addition to three primary colors, red (R), green (G), and blue (B) has been considered (see Patent Literature 1, for example). Since yellow (Y) and white (W) color filters have higher light use efficiency than other color filters, use of these colors in combination with the three primary colors improves the display brightness.

As described in Patent Literature 1, color filters are generally formed long in one direction and arranged such that these filters form a stripe pattern as a whole. In the case that color filters of four primary colors are used, the color filters can be arranged in a squared pattern, in which the color filters are arranged in two rows and two columns.

Also, recently, problems accompanying the change from color filters of three primary colors to those of four primary colors or from a stripe pattern to a squared pattern, such as reduction in resolution, have been addressed. For example, a method including varying the areas of colors in one pixel, or a method including forming one pixel using three primary colors selected from four primary colors are used (see Patent literature 2, for example).

CITATION LIST

Patent Literature

JP 2006-259135 A
JP 2008-96549 A

SUMMARY OF INVENTION

Technical Problem

A further study by the present inventors have revealed that, though the change from three primary colors to four primary colors can improve brightness, if each color filter in one pixel overlaps a black matrix with the same overlapping width, reduction in brightness and variation in the display quality may occur. The following will describe how it occurs.

FIG. 20 is a schematic plane view illustrating conventional color filters of four colors arranged in a stripe pattern. As illustrated in FIG. 20, each color filter 111 is stretched longitudinally in the column direction, and a black matrix 112 is formed between color filters 111 of different colors and between color filters 111 of the same color in different pixels. The colors of the color filters 111 include red 111R, green 111G, blue 111B, and yellow 111Y. Each pixel includes a repeating unit composed of the four color filters of different colors.

FIG. 21 is a schematic plane view illustrating conventional color filters of four colors arranged in a squared pattern. As illustrated in FIG. 21, four color filters are arranged in two rows and two columns, and a black matrix 112 is formed between the color filters 111 of different colors. The colors of the color filters 111 are red 111R, green 111G, blue 111B, and yellow 111Y. Each pixel includes a repeating unit composed of these four color filters.

In each of FIGS. 20 and 21, each color filter 111 overlaps at least a part of the black matrix 112. Specifically, each color filter covers a part of the black matrix 112. This is because the color filter 111 is allowed to have a wide margin for production to prevent a lack of the color filter in an aperture area (an area where no black matrix is formed) in manufacturing the color filter 111. Also, overlapping of the color filter 111 and a black matrix 112 can improve light shielding properties in a light shielding region and can prevent leakage of impurities from the materials of the black matrix 112 to the liquid crystal layer.

However, as a result of a detailed study, the present inventors have found out that such overlapping of a color filter and a black matrix causes reduction in brightness and variation of display quality. This is mainly because such overlapping of a color filter and a black matrix causes loss of the surface flatness of the color filter substrate.

FIG. 22 is a schematic cross-sectional view of a color filter substrate illustrating an overlapping region of a color filter and a black matrix. The color filter substrate includes an insulating substrate 121 such as a glass substrate that is abase. As illustrated in FIG. 22, if the color filter substrate has irregularities on its surface, liquid crystal molecules 161 near the irregular surface are aligned in a direction different from that in which molecules on the flat surface are aligned. Such an alignment disorder becomes pronounced especially when the level difference between the color filter 111 and the black matrix 112 is higher than 0.5 μm. Though such an alignment disorder in the area protected from light by the black matrix 112 does not have any effect on the display, an alignment disorder of liquid crystal molecules 161 at a part of the aperture area adjacent to the black matrix 112 may cause roughness of the displayed image, because liquid crystal displays are controlled using the birefringence of the liquid crystal molecules. Also, for example, in TN (Twisted Nematic) mode, in which the surface of the color filter substrate is subjected to a rubbing treatment, such irregularities prevent a uniform rubbing treatment of the surface. Thereby, some portions of the surface fail to be rubbing-treated, which may lead to light leakage and reduction in contrast ratio.

The present invention is devised in view of the state of the art, and aims to provide a liquid crystal display panel which can prevent roughness of the displayed image and reduction in contrast ratio accompanying use of four or more color filters of different colors.

Solution to Problem

Through studies of methods for preventing reduction in display quality caused by alignment disorder of liquid crystal molecules, the present inventors focused on smoothing irregularities on the surface of the color filter substrate. To smooth irregularities, for example, a planarizing layer may be formed on color filters and a black matrix. However, since such a planarizing layer itself is laminated on the color filters and black matrix, it is difficult to completely planarize the substrate surface. Also, the number of the manufacturing processes is increased. Alternatively, for example, to lower the height of the irregularities, the thickness of some color filters may be reduced. However, in the case of reducing the thickness of some color filters, the thickness of the color filter at an aperture area is also reduced, leading to variation of the cell thickness of the liquid crystal layer from one region to another. As a result, each pixel has a different crystal liquid capacity, which may adversely affect the display quality. Also, the irregularities may be relatively smoothed by reducing the thickness of the black matrix. However, in this case, the light shielding properties may not be sufficiently ensured, which may result in reduction in contrast ratio.

The present inventors, as a result of a keen examination, focused on an overlapping width with which a color filter overlaps a black matrix. They found out that the height of the irregularities varies according to the overlapping width and that reduction in the overlapping width of a color filter of a color with higher brightness minimizes the effect on the display, and an increase in the overlapping width of a color filter of a color with lower brightness improves light shielding properties in the light shielding region. Thereby, they have found a solution to the problem described above, and completed the present invention.

Namely, one aspect of the present invention is a liquid crystal display panel (herein after, also referred to as a first liquid crystal display panel of the present invention), comprising a color filter substrate provided with four or more color layers of different colors and a light shielding layer, each pixel including a repeating unit composed of the four or more color layers of different colors, the four or more color layers of different colors partially overlapping the light shielding layer, the liquid crystal display panel having a region where color layers of the same color in different pixels are arranged in the same rows or the same columns, and of the four or more color layers of different colors in one pixel, a color layer of a color with higher brightness overlapping a portion of the light shielding layer that is positioned between the color layer and another color layer of the same color with an overlapping width smaller than that with which a color layer of a color with lower brightness overlaps a portion of the light shielding layer that is positioned between the color layer and another color layer of the same color.

Also, another aspect of the present invention is a liquid crystal display panel (hereinafter, also referred to as a second liquid crystal display panel of the present invention), comprising a color filter substrate provided with four or more color layers of different colors and a light shielding layer, each pixel including a repeating unit composed of the four or more color layers of different colors, the four or more color layers of different colors partially overlapping the light shielding layer, and of two color layers selected from the four or more color layers of different colors in one pixel, a color layer of a color with higher brightness overlapping a portion of the light shielding layer that is positioned between the color layer and another color layer of a color with lower brightness with an overlapping width smaller than that with which the color layer of a color with lower brightness overlaps the portion of the light shielding layer.

The first liquid crystal display panel and the second crystal display panel are different in an arrangement of color layers (color filters) and a position of a light shielding layer which color layers overlap. For example, the overlapping width in the first liquid display panel is applicable to the overlapping width with which a color filter overlaps a portion of alight shielding layer that is positioned between the color filter and another color filter of the same color in a stripe pattern, a horizontally-long picture element pattern, or a zigzag (horizontal V-shape) pattern arrangement, in which color filters of the same color are stretched longitudinally in one direction. The overlapping width in the second liquid crystal display panel is applicable to the overlapping width with which a color filter overlaps a portion of a light shielding layer positioned between the color filter and a color filter of another color in a squared pattern or a delta pattern arrangement (the number of rows and columns may be the same or not), in which a plurality of color filters of different colors are arranged in a row direction and column direction, and the overlapping width with which a color filter overlaps a portion of a light shielding layer that is positioned between the color filter and a color filter of another color in a stripe pattern, a horizontally-long picture element pattern, or a zigzag (horizontal V-shape) pattern arrangement. Alternatively, either one or both of the first and second liquid display panels are appropriately used depending on the color filter arrangement. Thereby, the effect of the present invention can be exhibited.

The first and second liquid crystal display panels of the present invention each include a color filter substrate provided with four or more color layers of different colors and alight shielding layer. In the liquid crystal display panels, each pixel includes a repeating unit composed of the four or more color layers of different colors, and the four or more color layers of different colors partially overlap the light shielding layer. Increase in the number of the colors in one pixel from three to four enables further improvement in brightness and color reproduction range. Also, since the color filters are formed such that they overlap the light shielding layer, light shielding properties in the light shielding region can be improved.

In the first and the second liquid crystal display panels of the present invention, the disorder of liquid crystal molecules can be minimized in a position overlapping a color filter which more largely affects the display, and light shielding properties can be improved using a color layer which less affects the display. Thereby, display quality can be improved in a balanced manner. Also, the liquid crystal display panels can be more simply produced than liquid crystal panels produced using other methods for planarizing a color filter substrate, and have a wider margin for production. Thereby, the liquid crystal display panels have less negative factors such as reduction in contrast ration.

In the present description, an "overlapping width" means a width with which a color filter overlaps a light shielding layer in a region where the distance between aperture areas adjacent to each other is smallest. Also, "brightness" of a color is determined by a Y value in a standard colorimetric system (Yxy).

The structure of the liquid crystal display panel of the present invention is not particularly limited by other components as long as it essentially contains the components described above.

In the second liquid crystal display panel of the present invention, the width of the color layer of a color with higher brightness in a direction toward the color layer of a color with lower brightness is preferably smaller than that of the color layer of a color with lower brightness in a direction toward the color layer of a color with higher brightness. If the set width (total of the width of the aperture area and the overlapping width) of a color layer of a color with higher brightness is different from that of a color layer of a color with lower brightness, even when alignment deviation occurs, an overlapping width can more securely be different from one another.

In the second liquid crystal display panel of the present invention, preferably, the pixels are arranged in a matrix pattern, and either one of a combination of two color layers arranged in a row direction and a combination of two color layers arranged in a column direction corresponds to the two color layers selected from the four or more color layers of different colors in one pixel. Such a structure is preferred when an increase in a region where a color filter overlaps a black matrix has a priority. Such a structure enables improvement in light shielding properties, prevention of penetration of impurities into a liquid crystal layer, and securing of the margin for production.

In the second liquid crystal panel of the present invention, preferably, the pixels are arranged in a matrix pattern, and both of a combination of two color layers arranged in a row direction and a combination of two color layers arranged in a column direction correspond to the two color layers selected from the four or more color layers of different colors in one pixel. Such a structure is preferred when a decrease in a region where a color filter overlaps a black matrix has a priority. Such a structure can reduce the extent of the disorder of liquid crystal molecules in a region where a color filter which largely affects the display overlaps a black matrix.

In the first and second liquid crystal display panels of the present invention, the color layer of a color with higher brightness is a color layer of a color with the highest brightness of the four or more color layers of different colors in one pixel, and the overlapping width of the color layer of a color with the highest brightness is preferably smaller than that of any other color layers in the pixel. From the viewpoint of reducing the effect on the display area, it is the most efficient to reduce an effect by a color with the highest brightness.

Also, in such a case that the overlapping width of the color layer of a color with the highest brightness is the smallest, from the viewpoint of a more efficient production process, the overlapping widths of the color layers other than the color layer of a color with the highest brightness are preferably substantially the same. On the other hand, from the viewpoint of reducing the effect on the display area to the extent possible instead of the production process, an overlapping width of a color layer of a color other than the color with the highest brightness is preferably different from that of a color layer of a color other than the color with the highest brightness. In addition, the overlapping width is preferably smaller as the brightness of the color of the color layer increases.

Advantageous Effect of Invention

According to the liquid crystal display panel of the present invention, roughness of the displayed image and reduction in contrast ratio accompanying the use of four or more different color filters can be prevented.

DESCRIPTION OF EMBODIMENT

In the following, the present invention is described in more detail by way of embodiments, referring to drawings. However, these embodiments are not intended to limit the scope of the present invention.

In the present description, the word "substantially" is a concept including "virtually the same". In mathematical values, the concept covers errors within 10% of the total.

Embodiment 1

In Embodiment 1, a liquid crystal display panel includes a pair of substrates with a spacer to maintain the gap therebetween and a liquid crystal layer sealed between the pair of substrates. One of the pair of the substrates is a color filter substrate provided with color layers and a light shielding layer. In the liquid crystal display panel of Embodiment 1, each pixel includes a repeating unit composed of color layers of a plurality of colors. Thereby, the liquid crystal display panel of Embodiment 1 achieves the color display in which colors are controlled in each pixel.

In Embodiment 1, the color filter substrate includes an insulating substrate made of glass or the like that is a base and a color layer (hereinafter, also referred to as a color filter) and a light shielding layer (hereinafter, also referred to as a black matrix) on the insulating substrate. The black matrix is formed such that it separates the color filters from one another to prevent color mixing of the color filters and light leakage. The colors and the order of arrangement of the color filters are not particularly limited as long as the color filters are of four or more colors. For example, a combination of red (R), green (G), blue (B), and yellow (Y), a combination of red (R), green (G), blue (B), and white (W), or a combination of red (R), green (G), blue (B), magenta (M), and cyan (C) is used. If only one color is added to three colors including red (R), green (G), and blue (B), when improvement of brightness has a priority, white (W) is preferably added. When color reproduction range has a priority, yellow (Y) is preferably added. Here, in the present description, a white (W) color filter denotes a clear and colorless layer.

Here, among red (R), green (G), blue (B), yellow (Y), white (W), magenta (M), and cyan (C), brightness is high in the order of white (W), yellow (Y), cyan (C), green (G), magenta (M), red (R), and blue (B).

In the following, Embodiment 1 is described in detail, using an example in which four colors including red (R), green (G), blue (B), and yellow (Y) are used.

Figure 1:
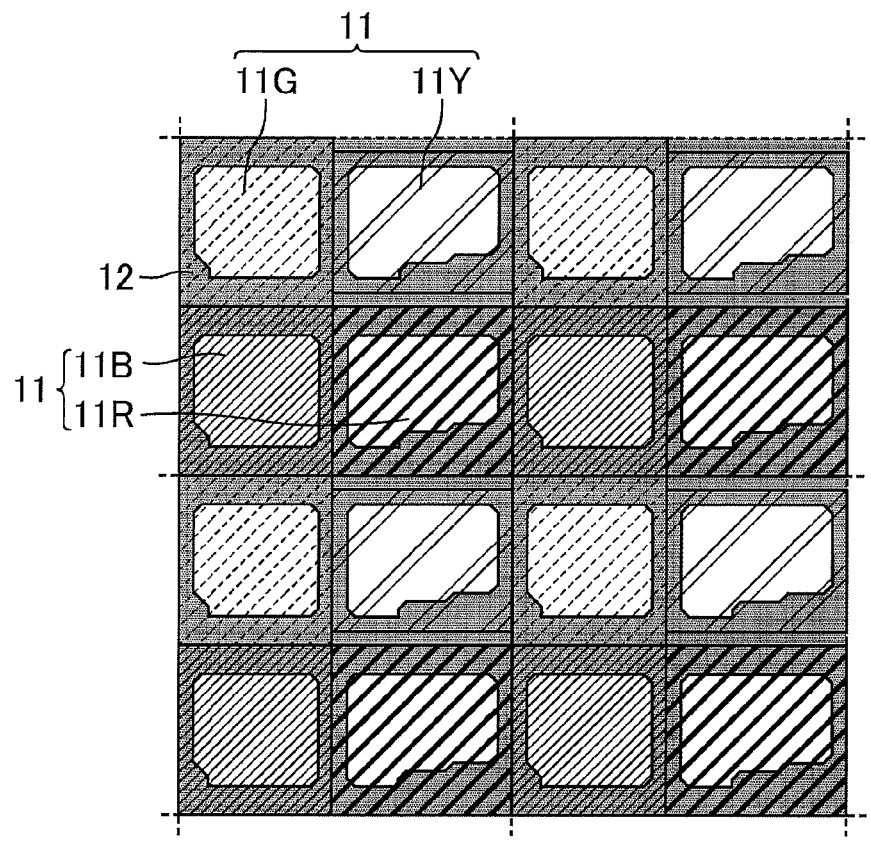
FIG. 1 is a schematic plane view of a color filter substrate of a liquid crystal display panel of Embodiment 1.

FIG. 1 is a schematic plane view of the color filter substrate of the liquid crystal display panel of Embodiment 1. In the liquid crystal display panel of Embodiment 1, the display area is composed of a plurality of pixels, and four color filters 11 including red 11R, green 11G, blue 11B, and yellow 11Y are arranged in one pixel, as shown in FIG. 1. The color filters 11 are arranged in a squared pattern, and the aperture areas are separated by a black matrix 12. Namely, the liquid crystal display panel of Embodiment 1 corresponds to the second liquid crystal display panel of the present invention. The structure of the liquid crystal display panel of Embodiment 1 may also be described as follows: the color filters 11 are arranged in two columns and two rows, and units each composed of the four color filters including red 11R, green 11G, blue 11B, and yellow 11Y are repeatedly arranged. Here, in FIG. 1, each area surrounded by dotted lines represents one pixel. The pixels are arranged in a matrix pattern.

In Embodiment 1, in terms of rows, yellow color filters 11Y and green color filters 11G are alternately arranged in one row and red color filters 11R and blue color filters 11B are alternately arranged in another row. In terms of columns, yellow color filters 11Y and red color filters 11R are alternately arranged and green color filters 11G and blue color filters 11B are alternately arranged in another column.

The black matrix 12 overlaps any of the color filters 11. The area surrounded by the black matrix 12 is an aperture area, which contributes to the display. That is, the black matrix 12 is formed such that it at least includes a boundary of different colors. The black matrix 12 overlapping the color filters 11 enables higher light shielding properties and improves the contrast ratio. The shape of each aperture area is substantially rectangular or quadrate, though it has a projecting portion or a cutout in a plane view. The shapes of the aperture areas of each green color filter 11G and each blue color filter 11B that are arranged in the column direction are the substantially same, and those of each yellow color filter 11Y and each red color filter 11R that are arranged in the column direction are substantially the same. Since it is preferable that the black matrix 12 is optionally formed in a position overlapping a TFT and/or a spacer described below, the shape of the aperture area can be appropriately changed depending on the structure.

In Embodiment 1, a certain gap is formed between each yellow color filter 11Y and each red color filter 11R. This gap is formed because the width with which the yellow color filter 11Y overlaps a portion of the black matrix 12 that is positioned between the yellow color filter 11Y and the red color filter 11R is different from the width with which the red color filter 11R overlaps the portion of the black matrix 12. The yellow color filter 11Y overlaps the portion of the black matrix 12 with width smaller than that with which red color filter 11R overlaps the portion of the black matrix 12.

The yellow color filter 11Y and the red color filter 11R are different in the color width (the total of the width of the aperture area and the overlapping width) itself. The color width of the yellow color filter 11Y in the direction toward a red color filter 11R (that is, in the column direction) is smaller than that of the red color filter 11R in the direction toward a yellow color filter 11Y (that is, in the column direction). The color widths in the column direction of the red color filter 11R, the green color filter 11G, and the blue color filter 11B are substantially the same.

Here, the color width of the yellow color filter 11Y in the row direction and that of the red color filter 11R in the row direction are substantially the same, and the color width of the green color filter 11G in the row direction and that of the blue color filter 11B in the row direction are substantially the same. The color width of the yellow color filter 11Y in the row direction and that of the red color filter 11R in the row direction are each larger than that of the green color filter 11G in the row direction and that of the blue color filter 11B in the row direction.

In liquid crystal display panels, generally, a large overlapping width of a black matrix and a color filter leads to easy formation of irregularities on the surface of the color filter substrate. Such irregularities on the surface of the color filter substrate affect the alignment of adjacent liquid crystal molecules, and thereby may prevent a desired alignment and cause roughness of the displayed image. Also, in a rubbing treatment of the color filter substrate, the treatment on such irregularities may be insufficient, which may lead to light leakage and reduction in the contrast ratio. These troubles which occur with respect to a color with higher brightness tend to have a greater effect on the display than the troubles which occur with respect to a color with lower brightness.

In Embodiment 1, when comparing yellow color filter 11Y and red color filter 11R, the yellow color filter 11Y, which is of a color with higher brightness, overlaps the black matrix 12 with an overlapping width smaller than that with which the red color filter 11R, which is of a color with lower brightness, overlaps the black matrix 12. Thereby, irregularities with high level difference are less likely to be formed around the aperture area of yellow 11Y. As a result, in comparison with the case that the overlapping width around the aperture area of the red 11R is small, roughness of the displayed image can be reduced, and the contrast ratio can be less likely to be reduced.

As described above, in Embodiment 1, only overlapping widths with which the color filters of the four colors overlap portions of the black matrix 12 in the row direction are different from each other. Specifically, the overlapping width of the yellow color filter 11Y, which is of a color with the highest brightness in the four colors of the red 11R, green 11G, blue 11B, and yellow 11Y, is the smallest, and those of the color filters of the other colors have no substantial difference.

The overlapping width of the yellow color filter 11Y is preferably 2.0 µm, and those of the color filters of the other colors are each preferably 2.75 to 5.0 µm.

The observation of the overlapping regions of the color filters 11 and the black matrix 12 and measurement of the overlapping width can be performed using a light microscope.

Figure 2:
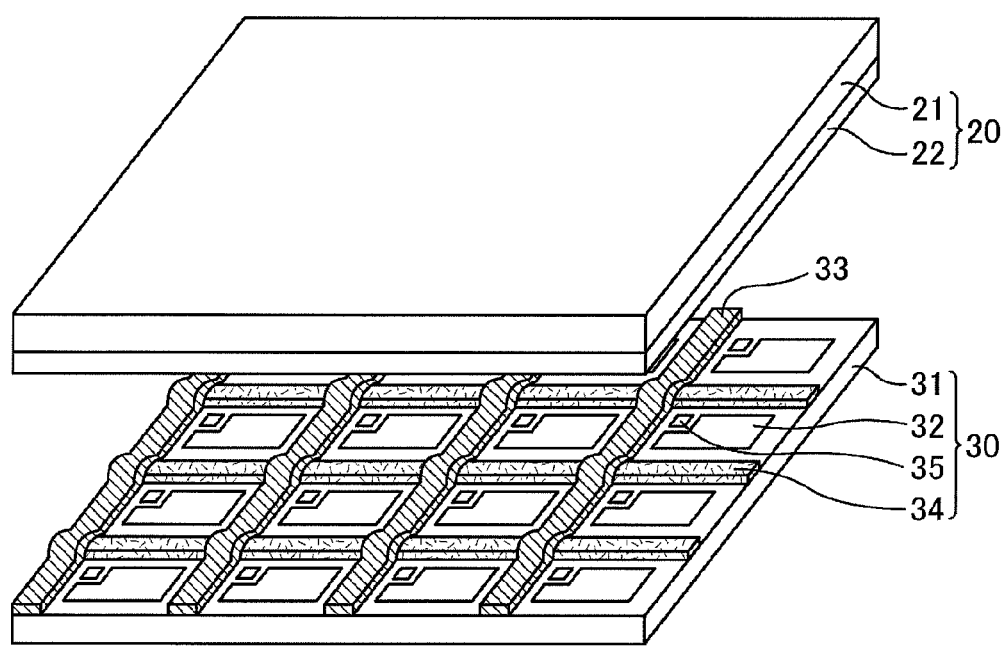
FIG. 2 is a schematic perspective view of the liquid crystal display panel of Embodiment 1.

FIG. 2 is a schematic perspective view of the liquid crystal display panel of Embodiment 1. In Embodiment 1, an active matrix substrate 30 faces a color filter substrate 20 with a liquid crystal layer interposed therebetween.

The active matrix substrate 30 includes an insulating substrate 31 made of glass or the like that is a base and electrodes and wirings formed on the insulating substrate 31. Picture element electrodes 32 are arranged such that each color filter overlaps one picture element electrode 32. Signals transmitted to the picture element electrodes 32 control the gray scale. Around the picture element electrode 32, a source signal line 33 for carrying source signals to the picture element electrode 32, a thin film transistor (TFT) 35 that functions as a switch for transmitting the source signals, and a gate signal line 34 for carrying gate signals that control the timing of carrying the source signals to the picture element electrode 32 are formed. These are optionally formed in different layers separated by insulating films so that they are insulated from each other. The TFT 35 is a three-terminal field-effect transistor, and includes three electrodes including a gate electrode, a source electrode, and drain electrode, in addition to a semiconductor layer. Here, in Embodiment 1, a multi drive may be used, in which one picture element electrode is divided into a plurality of sub-picture element electrodes and a TFT is connected to each of the sub-picture element electrode so that one gate wiring can control two sub-picture element electrodes.

In Embodiment 1, gate signal lines 34 are formed in the row direction, and source signal lines are formed in the column direction. On the color filter substrate 20, the black matrix 12 is formed such that it overlaps the gate signal lines 34, the source signal lines 33, and the TFTs 35, which improves the contrast ratio and prevents degradation of elements. The material of the black matrix 12 is not particularly limited as long as it has light shielding properties, and resin materials containing black pigments or metal materials having light shielding properties are suitably used. The size of the aperture area is determined by that of the area surrounded by the black matrix 12. The color filters of different colors may have the same size of aperture areas, or may have different size of aperture areas. The color of a color filter having a different aperture size is not particularly limited.

Figure 3:
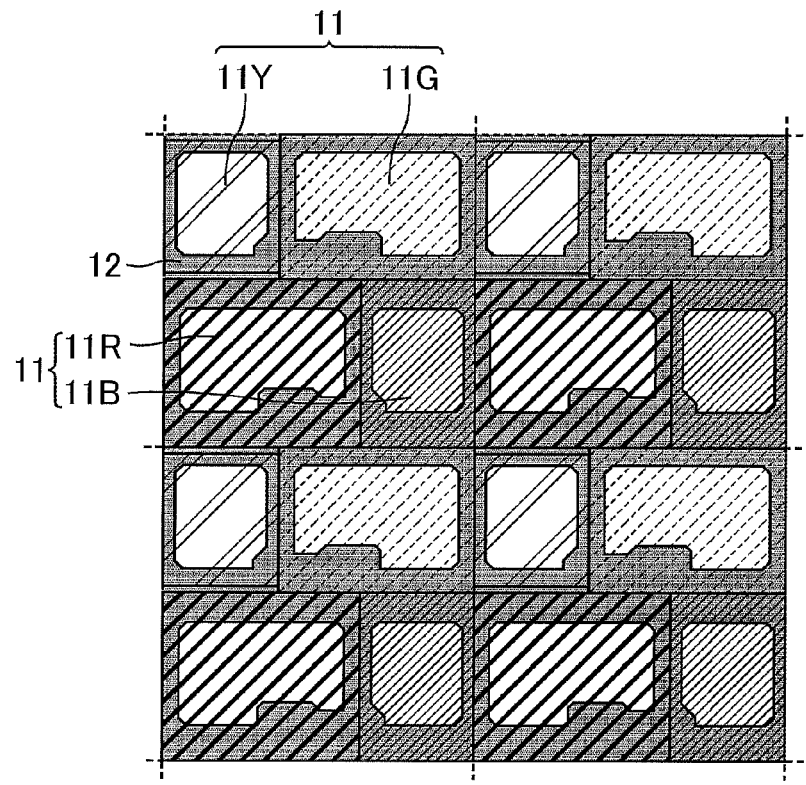
FIG. 3 is a schematic plane view of a color filter substrate of Embodiment 1, in which the aperture area of the green color filter is larger than that of the yellow color filter.

FIG. 3 is a schematic plane view of the color filter substrate of Embodiment 1 in which an aperture area of the green color filter 11G is larger than that of the yellow color filter 11Y. Basically, to improve transmissivity, the area of a color with higher brightness is widened. However, from the viewpoint of coloring of the entire display, the color filters may be arranged as illustrated in FIG. 3. Photosensitive resins (color resists) that transmit lights corresponding to respective colors are suitably used as a material of the color filters 11.

Here, in FIG. 3, the color width of the yellow color filter 11Y in the row direction and that of the blue color filter 11B in the row direction are substantially the same, and the color width of the green color filter 11G in the row direction and that of the red color filters 11R in the row direction are substantially the same. Also, the color width of the yellow color filter 11Y in the row direction and that of the blue color filter 11B in the row direction each are larger than that of the green color filter 11G in the row direction and that of the red color filter 11R in the row direction.

The color filter substrate 20 includes a common electrode 22 on the insulating substrate 21 made of glass or the like. Voltage is applied to the liquid crystal layer between the common electrode 22 and the picture element electrode 32. The common electrode 22 is formed on substantially the whole display area, not depending on the boundaries of the pixels. Here, the color filters and a black matrix are arranged between the insulating substrate 21 and the common electrode 22.

Figure 4:
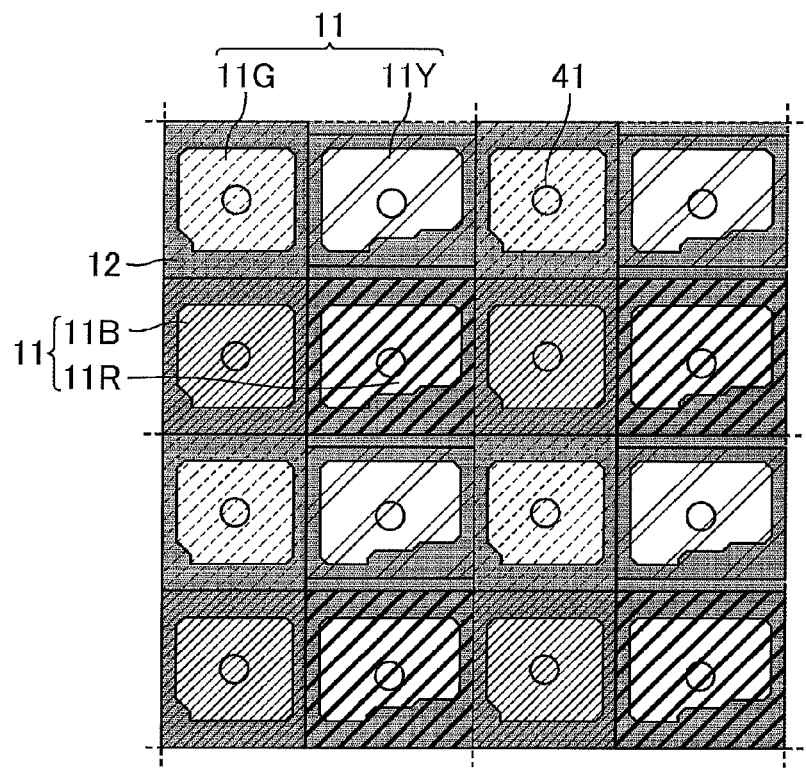
FIG. 4 is a schematic plane view of the color filter substrate of the liquid crystal display panel of Embodiment 1 in CPA mode.

The liquid crystal alignment mode of the liquid crystal panel is not particularly limited. To achieve multi-domain alignment in each pixel in Embodiment 1, in which the color filters are arranged in a squared pattern, CPA (Continuous Pinwheel Alignment) mode is suitably used. In CPA mode, a rivet 41 as an alignment control projection is formed on the color filter substrate to control the alignment of the liquid crystal molecules, as illustrated in FIG. 4. FIG. 4 is a schematic plane view of the color filter substrate of the liquid crystal display panel of Embodiment 1 in CPA mode. Since each color filter 11 has one rivet 41, multi domain is achieved in a balanced manner. Here, a hole in the common electrode, in place of the rivet, also enables multi domain. Examples of other liquid crystal alignment modes include TN (Twisted Nematic) mode, STN (Super Twisted Nematic) mode, VA (Vertical Alignment) mode, MVA (Multi-domain Vertical Alignment) mode, IPS (In-plane Switching) mode, FFS (Fringe Field Switching) mode, and TBA (Transverse Bend Alignment) mode.

Embodiment 2

The liquid crystal display panel of Embodiment 2 is the same as that of Embodiment 1, except that overlapping widths with which the color filters of respective colors overlap portions of the black matrix extending in the column direction are different from one another. The combination of four colors including red (R), green (G), blue (B), and yellow (Y) is used here again. However, the combination of the colors is not limited thereto. Here, the liquid crystal display panel of Embodiment 2 corresponds to the second liquid crystal display panel of the present invention.

Figure 5:
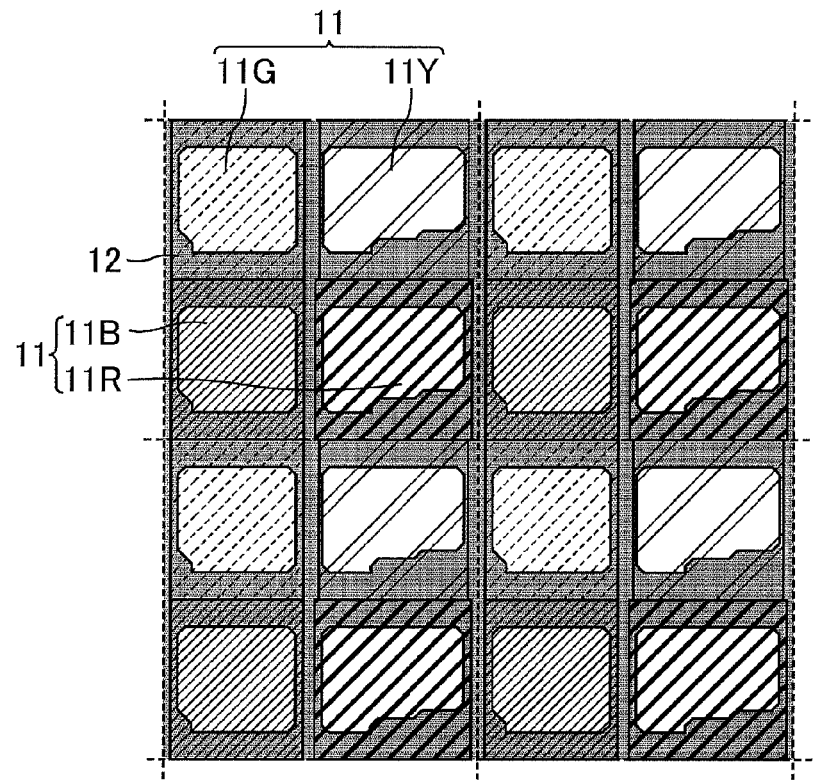
FIG. 5 is a schematic plane view of a color filter substrate of a liquid crystal display panel of Embodiment 2.

FIG. 5 is a schematic plane view of the color filter substrate of the liquid crystal display panel of Embodiment 2. In the liquid crystal display panel of Embodiment 2, as illustrated in FIG. 5, the display area is composed of a plurality of pixels each including color filters 11 of four colors that include red 11R, green 11G, blue 11B, and yellow 11Y. The color filters 11 are arranged in a squared pattern, and the aperture areas are separated by a black matrix 12.

In Embodiment 2, a gap is formed between the yellow color filter 11Y and the green color filter 11G and between the red color filter 11R and the blue color filter 11B. The yellow color filter 11Y has a smaller overlapping width than any other color filters, and the overlapping widths of the green color filter 11G, the red color filter 11R, and the blue color filter 11B are substantially the same.

In Embodiment 2, the color width of the yellow color filter 11Y in the direction toward the green color filter 11G (that is, in the row direction) is smaller than that of the green color filter 11G in the direction toward the yellow color filter 11Y (that is, in the row direction). The color width of the red color filter 11R in the row direction, the color width of the green color filter 11G in the row direction, and the color width of the blue color filter 11B in the row direction are substantially the same.

Figure 6:
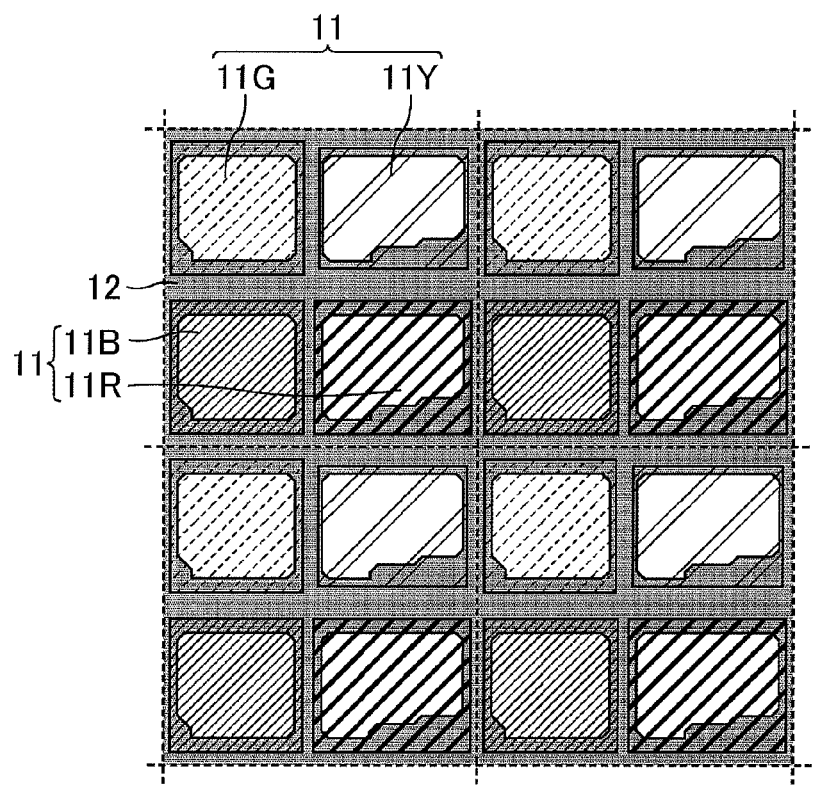
FIG. 6 is a schematic plane view of a modified example of the color filter substrate of the liquid crystal display panel of Embodiment 2.

In Embodiment 2, as illustrated in FIG. 6, not only the overlapping widths with which color filters of the four colors overlap portions of the black matrix 12 extending in the column direction, but also the overlapping widths with which color filters of the four colors overlap portions of the black matrix 12 extending in the row direction may be different from each other. FIG. 6 is a schematic plane view of a modified example of the color filter substrate of the liquid crystal display panel of Embodiment 2.

In the modified example illustrated in FIG. 6, the yellow color filter 11Y has a smaller overlapping width than any other color filters, and the overlapping widths of the green color filter 11G, the red color filter 11R, and the blue color filter 11B are substantially the same.

Also, the color width of the red color filter 11R in the row direction, the color width of the green color filter 11G in the row direction, and the color width of the blue color filter 11B in the row direction are substantially the same. The color width of the yellow color filter 11Y in the row direction is smaller than any of these.

Embodiment 3

The liquid crystal display panel of Embodiment 3 is the same as that of Embodiment 1 or 2, except that overlapping widths with which the color filters of respective colors overlap the black matrix are different from one another, and that the overlapping width is smaller as the brightness of the color of the color filter increases. The combination of four colors including red (R), green (G), blue (B), and yellow (Y) is used here again. However, the combination of colors is not limited thereto. Here, the liquid crystal display panel of Embodiment 3 corresponds to the second liquid crystal display panel of the present invention.

Figure 7:
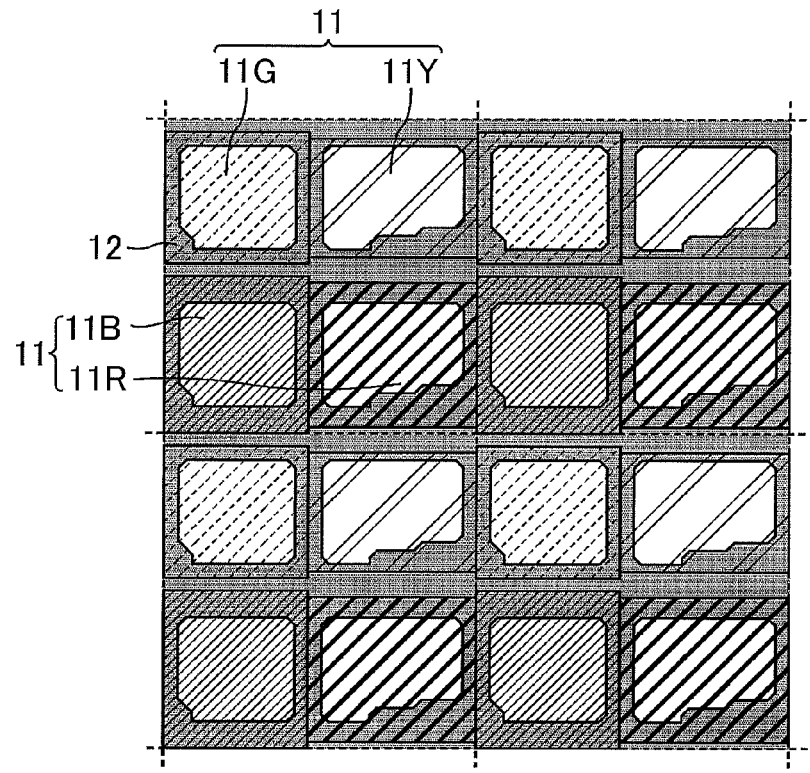
FIG. 7 is a schematic plane view of a color filter substrate of a liquid crystal display panel of Embodiment 3.

FIG. 7 is a schematic plane view of the color filter substrate of the liquid crystal display panel of Embodiment 3. In the liquid crystal display panel of Embodiment 3, as illustrated in FIG. 7, the display area is composed of a plurality of pixels each including color filters 11 of four colors that include red 11R, green 11G, blue 11B, and yellow 11Y. The color filters 11 are arranged in a squared pattern, and the aperture areas are separated by a black matrix 12.

In Embodiment 3, a gap is formed not only between the yellow color filter 11Y and the red color filter 11R, but also formed between the green color filter 11G and the blue color filter 11B. Also, overlapping widths with which the color filters of respective colors overlap portions of the black matrix extending in the row direction are different from one another, which causes the difference in the size of the gaps. Here, in Embodiment 3, the overlapping widths with which the color filters overlap the portions of the black matrix extending in the column direction are substantially the same.

The order of the overlapping width of the color filters is blue 11B>red 11R>green 11G>yellow 11Y, which is the exact reverse of the descending order of brightness of the colors of the color filters. Specifically, the overlapping width of the yellow color filter 11Y is 2.0 μm, that of the green color filter 11G is 3.0 μm, that of the red color filter 11R is 4.0 μm, and that of the blue color filter 11B is 5.0 μm.

In Embodiment 3, color widths themselves of the color filters of respective colors in the column direction are different from one another. The order of the color width of the color filters in the column direction is blue 11B>red 11R>green 11G>yellow 11Y, which is the exact reverse of the descending order of brightness of the colors of the color filters.

Figure 8:
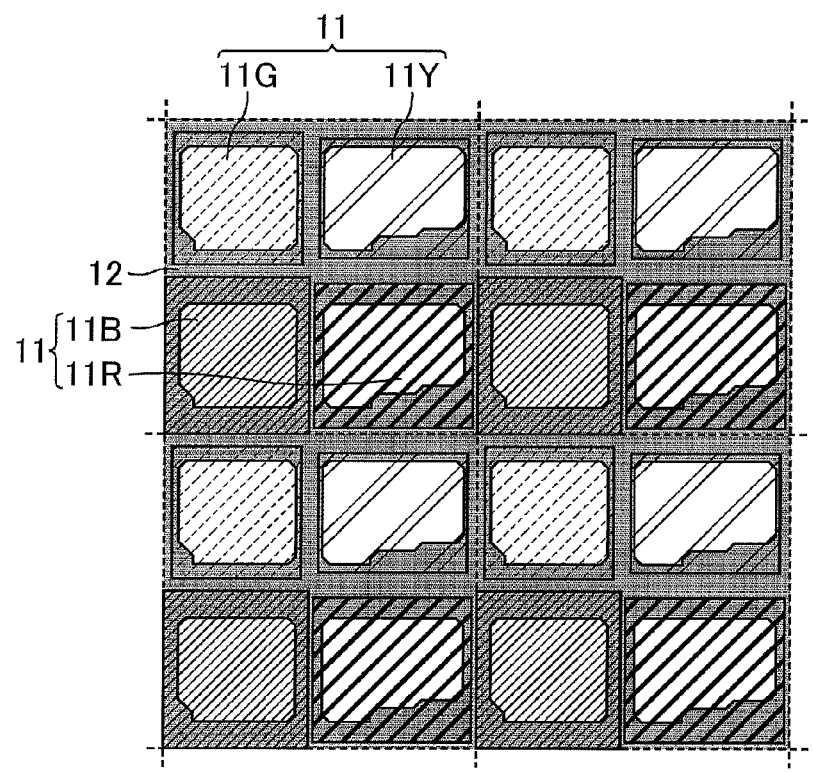
FIG. 8 is a schematic plane view of a modified example of the color filter substrate of the liquid crystal display panel of Embodiment 3.

In Embodiment 3, not only the overlapping widths with which color filters of the four colors overlap portions of the black matrix 12 extending in the row direction, but also the overlapping widths with which color filters of the four colors overlap portions of the black matrix 12 extending in the column direction may be different from each other. FIG. 8 is a schematic plane view of a modified example of the color filter substrate of the liquid crystal display panel of Embodiment 3. In the example illustrated in FIG. 8, the order of the overlapping width with which the color filter overlaps a portion of the black matrix in the column direction is also blue 11B>red 11R>green 11G>yellow 11Y, which is the exact reverse of the descending order of brightness of the colors of the color filters. Specifically, the overlapping width of the yellow color filter 11Y is 2.0 μm, that of the green color filter 11G is 3.0 μm, that of the red color filter 11R is 4.0 μm, and that of the blue color filter 11B is 5.0 μm.

In the example illustrated in FIG. 8, color widths themselves of the color filters of respective colors in the row direction are different from one another. The order of the color width of the color filter in the row direction is blue 11B>red 11R>green 11G>yellow 11Y, which is the exact reverse of the order of brightness of the colors of the color filters.

In Embodiment 3, the difference between an overlapping width of a color filter of a color with high brightness and that of a color filter of a color with low brightness is preferably 0.75 μm or larger. Examples of other set overlapping widths include: (1) 2.0 μm, 3.5 μm, 5.0 μm, and 6.5 μm; (2) 2.0 μm, 3.0 μm, 4.0 μm, and 5.0 μm; (3) 2.0 μm, 2.5 μm, 3.0 μm, and 3.5 μm; and (4) 2.0 μm, 2.25 μm, 2.50 μmm, and 2.75 μm.

Embodiment 4

The liquid crystal display panel of Embodiment 4 is the same as that of Embodiment 1 or 2, except that the order of the overlapping width of the color filter other than a color filter of a color with the highest brightness does not correlate to the order of brightness of the colors of the color filters. The combination of four colors including red (R), green (G), blue (B), and yellow (Y) is used here again. However, the combination of colors is not limited thereto. Here, the liquid crystal display panel of Embodiment 4 corresponds to the second liquid crystal display panel of the present invention.

Figure 9:
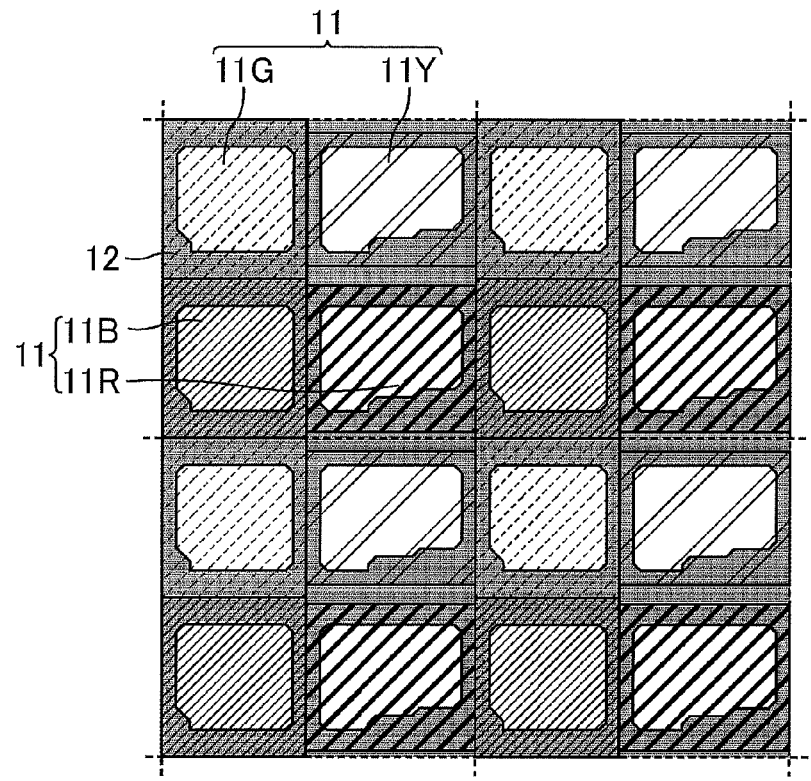
FIG. 9 is a schematic plane view of a color filter substrate of a liquid crystal display panel of Embodiment 4.

FIG. 9 is a schematic plane view of the color filter substrate of the liquid crystal display panel of Embodiment 4. In the liquid crystal display panel of Embodiment 4, as illustrated in FIG. 9, the display area is composed of a plurality of pixels each including color filters 11 of four colors that include red 11R, green 11G, blue 11B, and yellow 11Y. The color filters 11 are arranged in a squared pattern, and the aperture areas are separated by a black matrix 12.

In Embodiment 4, a gap is formed not only between the yellow color filter 11Y and the red color filter 11R, but also formed between the green color filter 11G and the blue color filter 11B. Also, in Embodiment 4, overlapping widths with which the color filters of respective colors overlap portions of the black matrix extending in the row direction are different from one another, which causes the difference in the size of the gaps. Here, in Embodiment 4, the overlapping widths with which the color filters overlap the portions of the black matrix extending in the column direction are substantially the same.

The order of the overlapping width of the color filters is green 11G=blue 11B>red 11R>yellow 11Y. This order does not correlate to the order of the brightness of the colors of the color filters, except that the overlapping width of the yellow color filter 11Y, which is of a color with the highest brightness, is the smallest.

In the example illustrated in FIG. 9, color widths themselves of the color filters of respective colors in the column direction are different from one another. The order of the color width of the color filters in the column direction is green 11G=blue 11B>red 11R>yellow 11Y.

Figure 10:
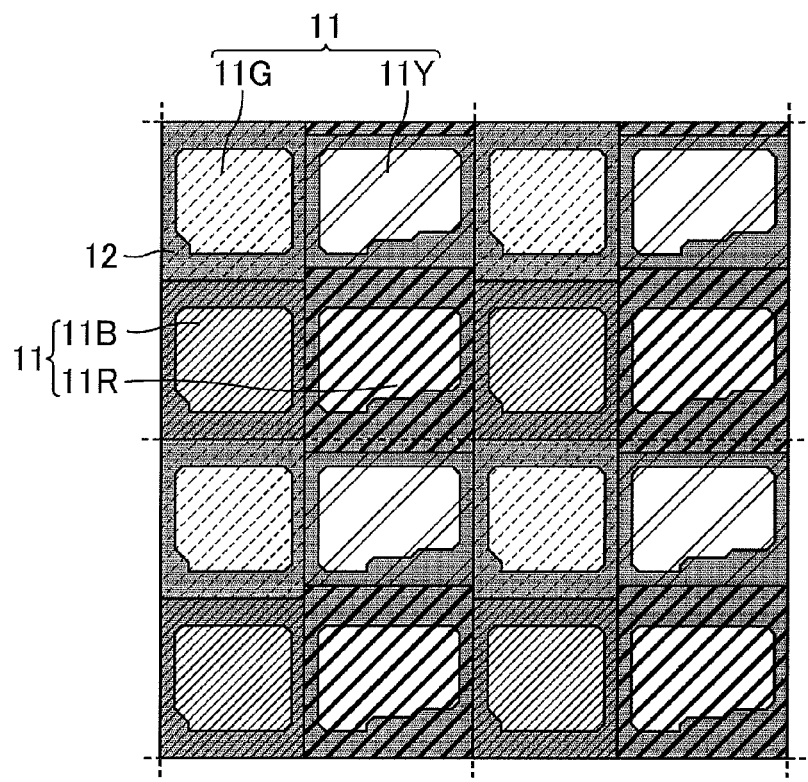
FIG. 10 is a schematic plane view of a first modified example of the color filter substrate of the liquid crystal display panel of Embodiment 4.

FIG. 10 is a schematic plane view of a first modified example of the color filter substrate of Embodiment 4. In the first modified example, the overlapping width with which the red color filter 11R overlaps a portion of the black matrix 12 between the red color filter 11R and the yellow color filter 11Y is larger than those of the color filters of the other colors, and thereby, no gap is formed between the yellow color filter 11Y and the red color filter 11R. In other words, the color filter substrate of the first modified example can be prepared by filling the gap between the yellow color filter 11Y and the red color filter 11R with the red color filter 11R in the color filter substrate illustrated in FIG. 1 of Embodiment 1. By filling the gap, the extent of overlapping of color filters is increased, and thereby light shielding properties can be improved, leading to improvement of the contrast ratio.

In the example illustrated in FIG. 10, the order of the overlapping width of the color filters is green 11G=blue 11B>red 11R>yellow 11Y, and the order of the color width of the color filters in the column direction is green 11G=blue 11B>red 11R>yellow 11Y.

Figure 11:
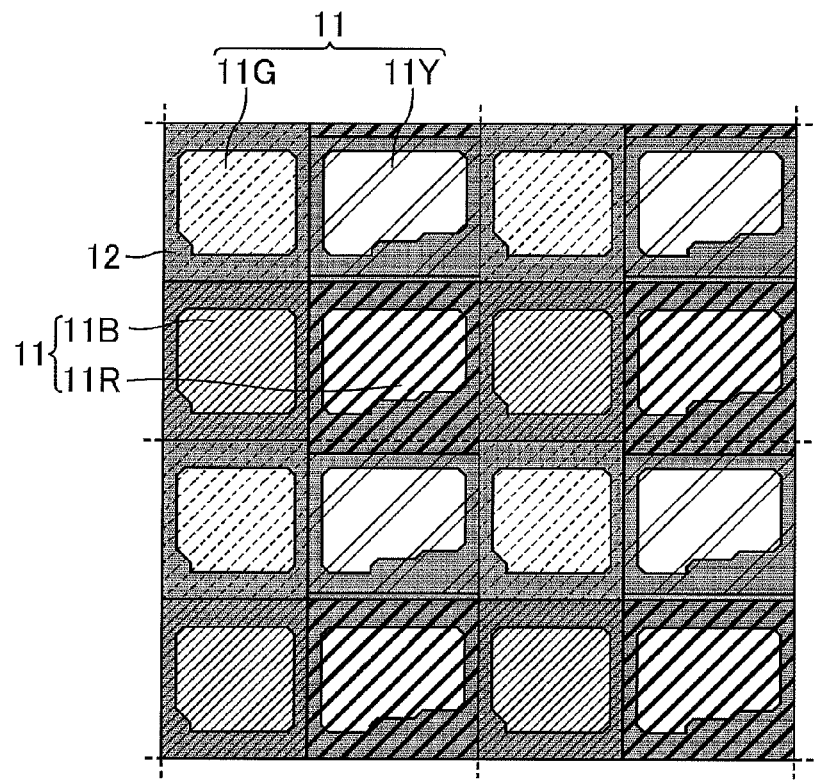
FIG. 11 is a schematic plane vies of a second modified example of the color filter substrate of the liquid crystal display panel of Embodiment 4.

FIG. 11 is a schematic plane view of a second modified example of the color filter substrate of Embodiment 4. As illustrated in FIG. 11, there optionally may be both a region where a gap is formed and a region where no gap is formed between a red color filter 11R and a yellow color filter 11Y in the color filter substrate.

In the example illustrated in FIG. 11, the order of the overlapping width of the color filters is green 11G=blue 11B=red 11R>yellow 11Y, whereas the order of the color width of the color filters in the column direction is red R11>green 11G=blue 11B>yellow 11Y.

FIGS. 9 to 11 illustrate examples in which the color filters 11 of the four colors each overlap a portion of the black matrix 12 in the column direction with substantially the same overlapping width. However, in Embodiment 4, the overlapping widths with which the color filters overlap portions of the black matrix 12 in the column direction may be different from each other. That is, the features of Embodiment 2 can appropriately be incorporated in Embodiment 4.

Embodiment 5

The liquid crystal display panel of Embodiment 5 is the same as that of Embodiments 1, 2, 3 or 4, except that the color filters are arranged in a stripe pattern not in a squared pattern. The combination of four colors including red (R), green (G), blue (B), and yellow (Y) is used here again. However, the combination of colors is not limited thereto. Here, the liquid crystal display panel of Embodiment 5 corresponds to the first or second liquid crystal display panel of the present invention.

Figure 12:
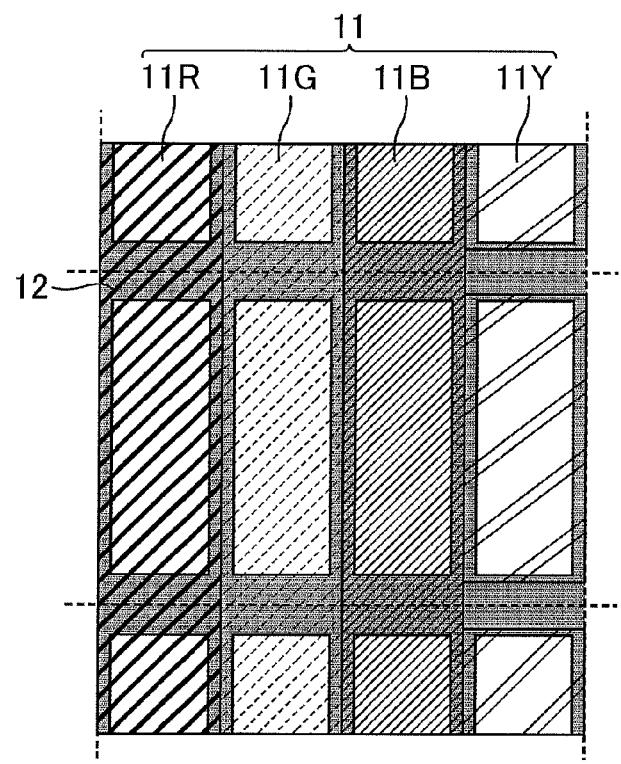
FIG. 12 is a schematic plane view of a color filter substrate of a liquid crystal display panel of Embodiment 5, illustrating a single scan.
Figure 13:
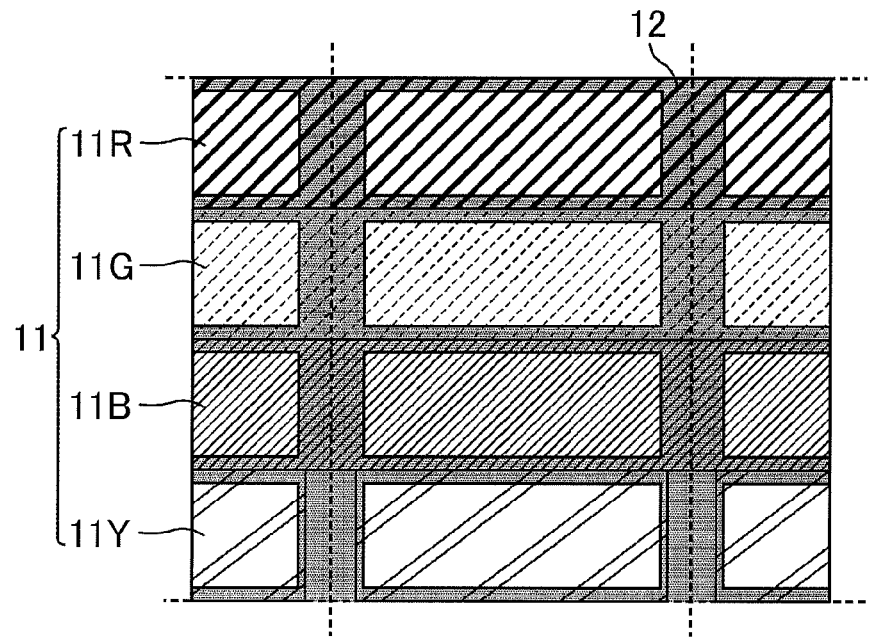
FIG. 13 is a schematic plane view of the color filter substrate of the liquid crystal display panel of Embodiment 5, illustrating a triple scan.

FIGS. 12 and 13 are schematic plane views of the color filter substrate of the liquid crystal display panel of Embodiment 5. In FIG. 12, each color filter is longer in the column direction than in the row direction (single scan), and in FIG. 13, each color filter is longer in the row direction than in the column direction (triple scan). In the liquid crystal display panel of Embodiment 5, as illustrated in FIGS. 12 and 13, the display area is composed of a plurality of pixels each including color filters 11 of four colors that include red 11R, green 11G, blue 11B, and yellow 11Y. The color filters 11 are arranged in a stripe pattern, and the aperture areas are separated by a black matrix 12. The color filters may be stretched longitudinally either in the column direction or in the row direction.

In the examples illustrated in FIGS. 12 and 13, only the overlapping width of each yellow color filter 11Y, which is of a color with the highest brightness, is adjusted to be smaller than those of the color filters of the other colors. The color filters of other colors are stretched longitudinally in one direction, and arranged such that no gap is formed around a boundary of pixels. In other words, a gap is formed only between yellow color filters 11Y in adjacent pixels.

Figure 14:
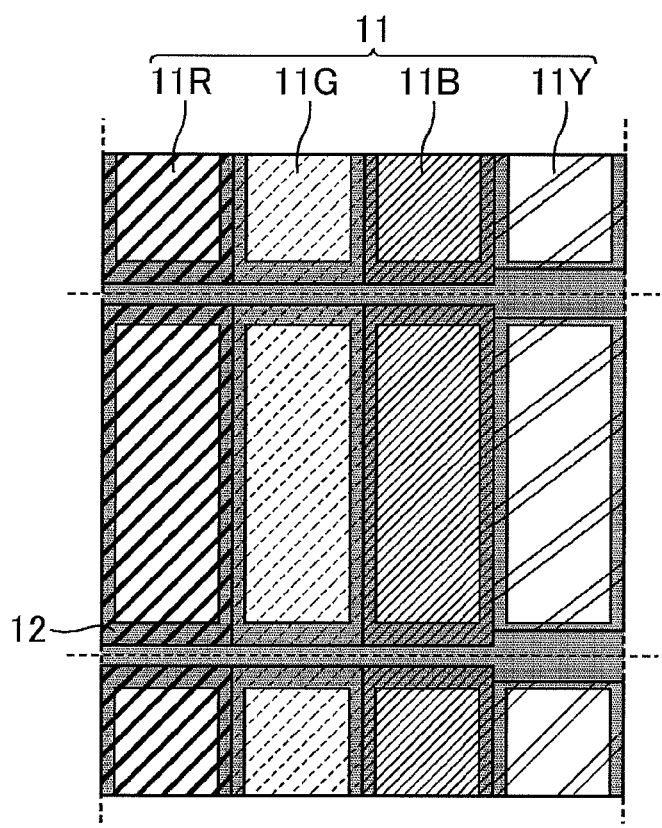
FIG. 14 is a schematic plane view of a modified example of the color filter substrate of the liquid crystal display panel of Embodiment 5, illustrating a single scan.
Figure 15:
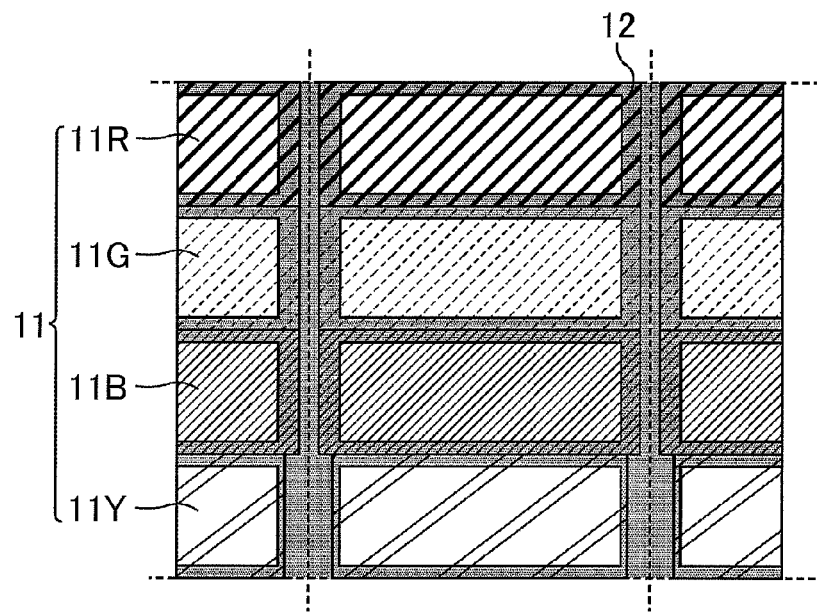
FIG. 15 is a schematic plane view of a modified example of the color filter substrate of the liquid crystal display panel of Embodiment 5, illustrating a triple scan.

FIGS. 14 and 15 are schematic plane views of modified examples of the color filter substrate of the liquid crystal display panel of Embodiment 5. In FIG. 14, each color filter is longer in the column direction than in the row direction (single scan), and in FIG. 15, each color filter is longer in the row direction than in the column direction (triple scan).

In the examples illustrated in FIGS. 14 and 15, a gap is formed not only between yellow color filters 11Y, but also between color filters, other than the yellow color filters 11Y, of the same color in adjacent pixels. The overlapping width of the color filter 11Y, which is of a color with the highest brightness, is the smallest, and those of the color filters of the other colors are substantially the same.

The features of Embodiments 1 to 4 can appropriately be incorporated in Embodiment 5. For example, the overlapping width with which the color filter overlaps a portion of the black matrix in the column direction may be changed in Embodiment 5.

Embodiment 6

The liquid crystal display panel in Embodiment 6 is the same as that of Embodiment 5, except that a plurality of protrusions for control of the alignment of liquid crystal molecules is formed so that the liquid crystal alignment mode be MVA mode. The combination of four colors including red (R), green (G), blue (B), and yellow (Y) is used here again. However, the combination of colors is not limited thereto. Here, the liquid crystal display panel of Embodiment 6 corresponds to the first or second liquid crystal display panel of the present invention.

Figure 16:
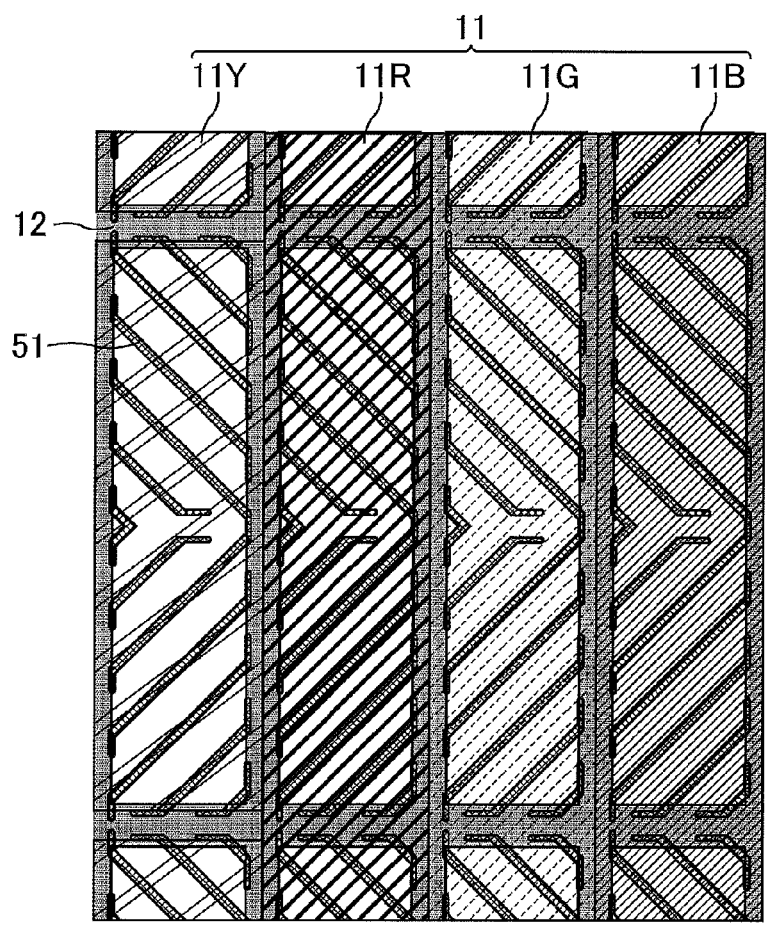
FIG. 16 is a schematic plane view of a color filter substrate of a liquid crystal display panel of Embodiment 6, illustrating a single scan.
Figure 17:
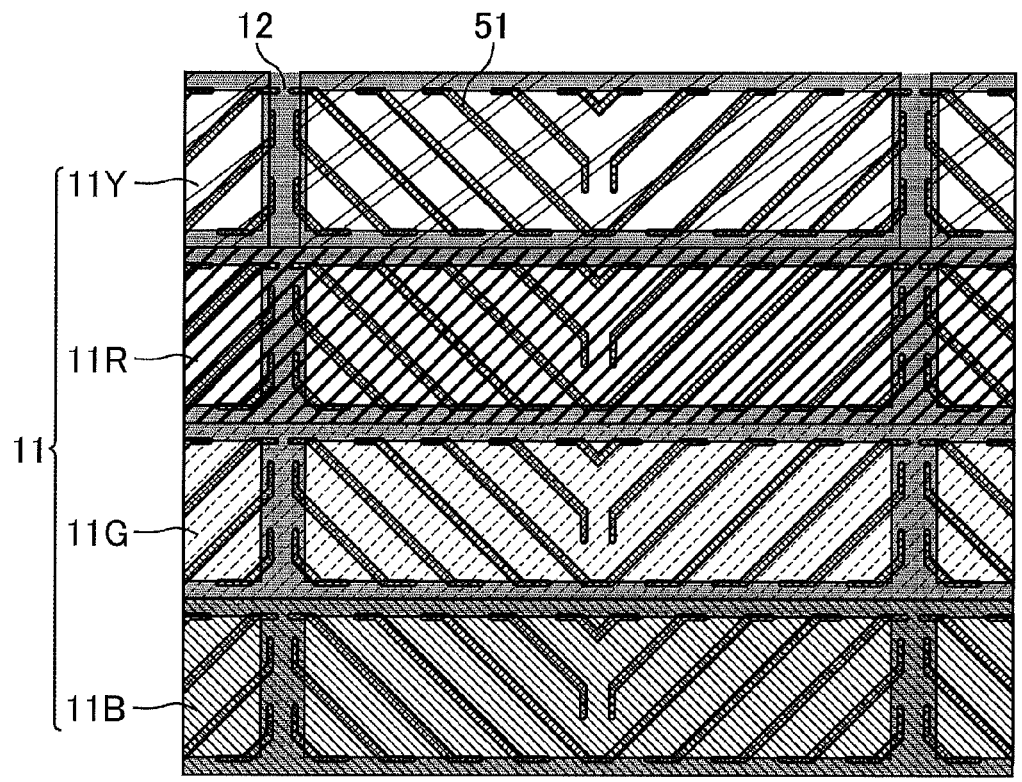
FIG. 17 is a schematic plane view of the color filter substrate of the liquid crystal display panel of Embodiment 6, illustrating a triple scan.

FIGS. 16 and 17 are schematic plane views of the color filter substrate of the liquid crystal display panel of Embodiment 6. In FIG. 16, each color filter is longer in the column direction than in the row direction (single scan), and in FIG. 17, a color filter is longer in the row direction than in the column direction (triple scan). In the liquid crystal display panel of Embodiment 6, as illustrated in FIGS. 16 and 17, the display area is composed of a plurality of pixels each including color filters 11 of four colors that include red 11R, green 11G, blue 11B, and yellow 11Y. The color filters 11 are arranged in a stripe pattern in which each color filter is stretched longitudinally in one direction, and the aperture areas are separated by a black matrix 12. The color filters may be stretched either in the column direction or in the row direction.

In the examples illustrated in FIGS. 16 and 17, the overlapping width of each color filter is according to that in FIGS. 14 and 15, rather than that in FIGS. 12 and 13. In the liquid crystal display panel in MVA mode, a rib 51 made of an insulating material such as a photosensitive acrylic resin is formed on the surface of the color filter substrate. The rib 51 makes liquid crystal molecules tilt toward the rib 51 during application of voltage, leading to wide viewing angle. The rib 51 has a liner shape or is partially bent in a plane view of the color filter substrate. The ribs 51 are arranged in a zigzag pattern as a whole, not depending on pixel divisions. Also, the rib 51 is stretched in such a direction that it forms an angle (e.g. 30° to 60°) with a long side and short side of the color filter 11, and thereby separates one pixel in a plurality of domains.

Embodiment 7

The liquid crystal display panel of Embodiment 7 is the same as that of Embodiments 1, 2, 3, or 4, except that the color filters are arranged in a delta pattern not in a squared pattern. The combination of four colors including red (R), green (G), blue (B), and yellow (Y) is used here again. However, the combination of colors is not limited thereto. Here, the liquid crystal display panel of Embodiment 7 corresponds to the second liquid crystal display panel of the present invention.

Figure 18:
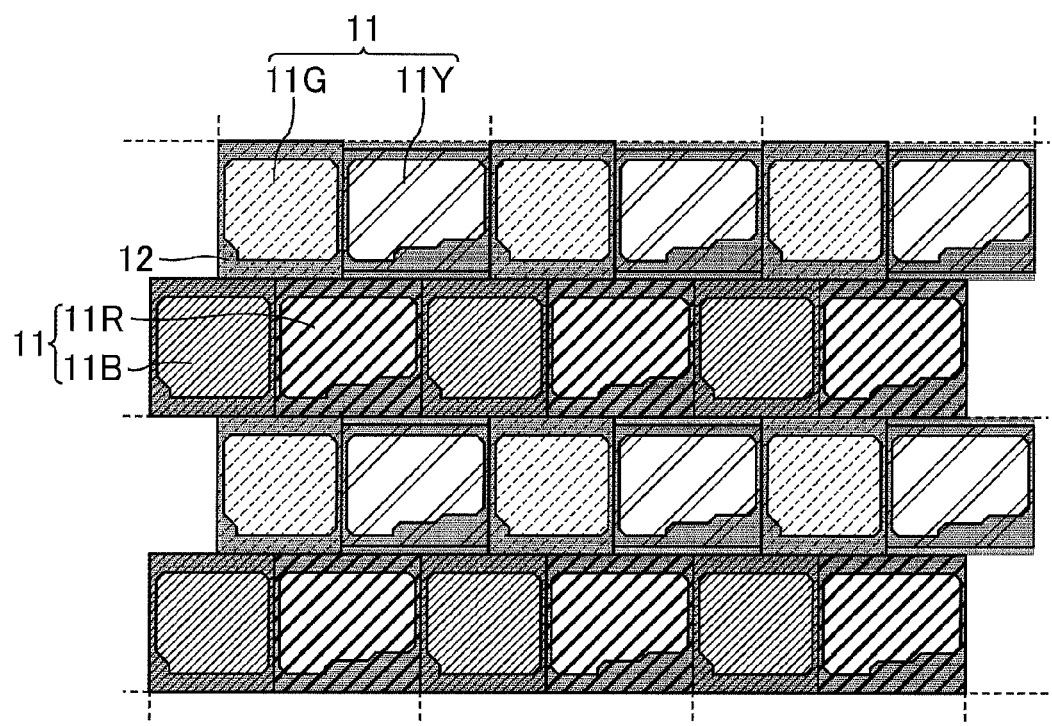
FIG. 18 is a schematic plane view of a color filter substrate of a liquid crystal display panel of Embodiment 7.

FIG. 18 is a schematic plane view of the color filter substrate of the liquid crystal display panel of Embodiment 7. As illustrated in FIG. 18, color filters 11 form neither a row nor a column, and are arranged in a pattern similar to a squared pattern except that the color filters 11 in rows and columns are displaced by half the length of one color filter. In Embodiment 7, as in the case of Embodiment 1, the overlapping width with which each yellow color filter 11Y, which is of a color with the highest brightness, overlaps the black matrix 12 is the smallest, and the overlapping widths of the color filters of the other colors are substantially the same.

Embodiment 8

The liquid crystal display panel in Embodiment 8 is the same as that of Embodiment 5, except that the shape of each color filter is substantially V-shape (horizontal V-shape), not a rectangle. The combination of four colors including red (R), green (G), blue (B), and yellow (Y) is used here again. However, the combination of the colors is not limited there to. Here, the liquid crystal display panel of Embodiment 8 corresponds to the first or second liquid crystal display panel in the present invention.

Figure 19:
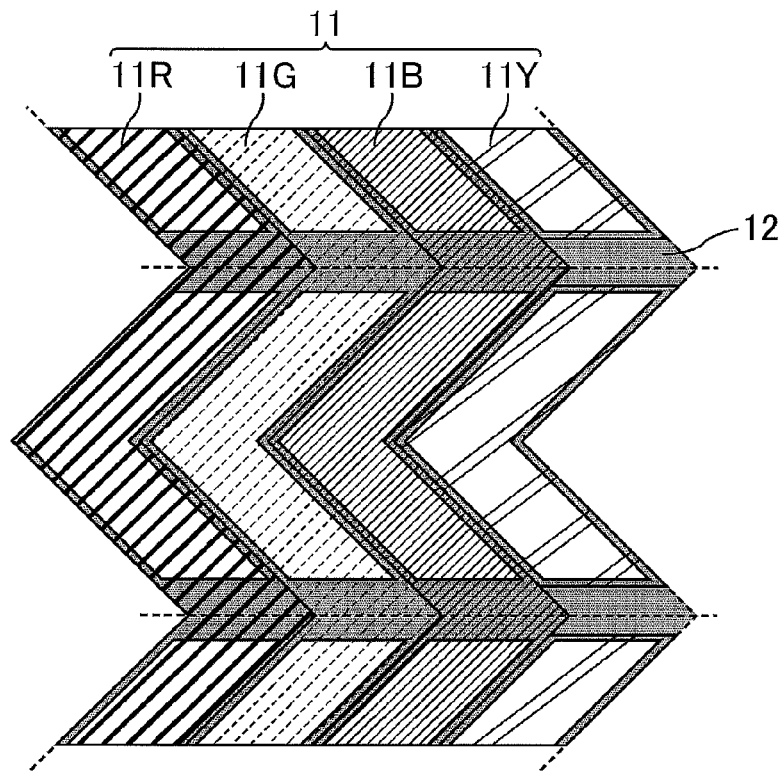
FIG. 19 is a schematic plane view of a color filter substrate of a liquid crystal display panel of Embodiment 8.
Figure 20:
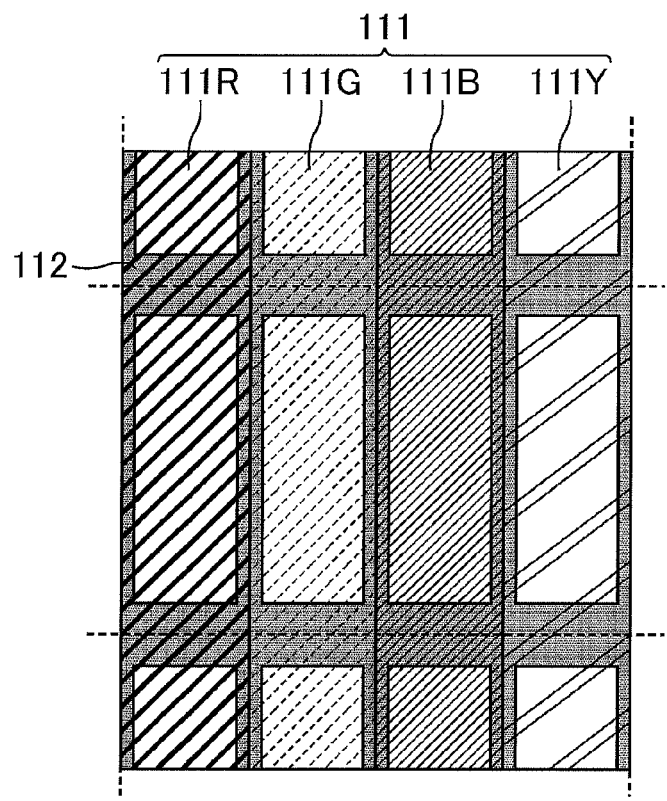
FIG. 20 is a schematic plane view of conventional color filters of four colors arranged in a stripe pattern.
Figure 21:
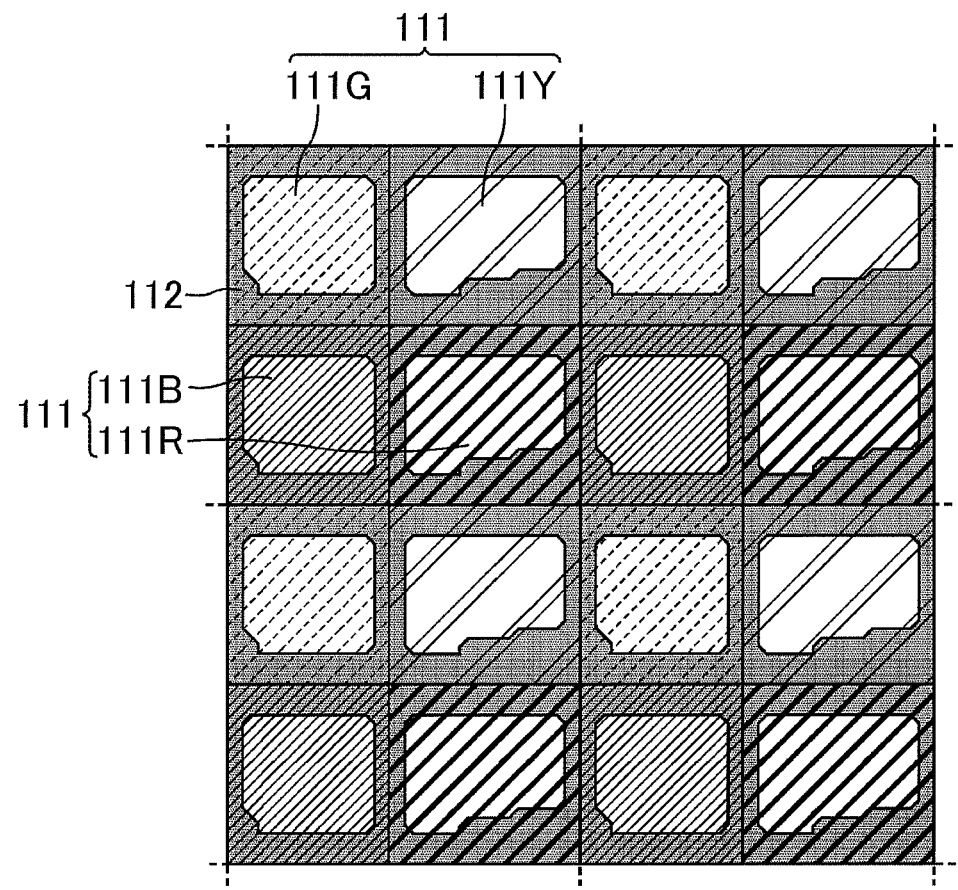
FIG. 21 is a schematic plane view of conventional color filters of four colors arranged in a squared pattern.
Figure 22:
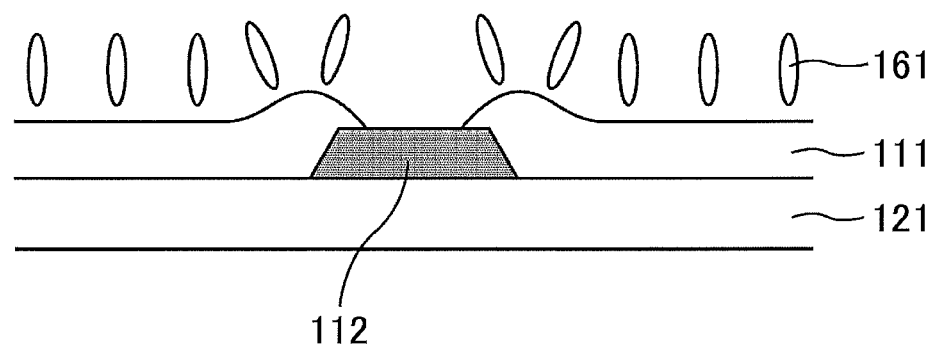
FIG. 22 is a schematic cross-sectional view of a color filter substrate illustrating an overlap region of a color filter and a black matrix.

FIG. 19 is a schematic plane view of the color filter substrate of the liquid crystal display panel of Embodiment 8. As illustrated in FIG. 19, each color filter 11 is not substantially rectangular, and lines of the color filters in the row direction form a zigzag pattern as a whole, not depending on pixel divisions. In Embodiment 8, as in the case of Embodiment 5, the overlapping width with which the yellow color filter 11Y, which is of a color with the highest brightness, overlaps the black matrix 12 is the smallest, and the overlapping widths of the color filters of the other colors are substantially the same.

The present application claims priority to Patent Application No. 2010-251321 filed in Japan on Nov. 9, 2010 under the Paris Convention and provisions of national law in a designated State, the entire contents of which are hereby incorporated by reference.

REFERENCE SIGNS LIST

11, 111: Color filter (color layer)
11R, 111R: Red color filter
11G, 111G: Green color filter
11B, 111B: Blue color filter
11Y, 111Y: Yellow color filter
12, 112: Black matrix (light shielding layer)
20: Color filter substrate
21, 31, 121: Insulating substrate
22: Common electrode
30: Active matrix substrate
32: Picture element electrode
33: Source wiring
34: Gate wiring
35: TFT
41: Rivet
51: Rib
161: Liquid crystal molecule

The invention claimed is:

1. A liquid crystal display panel, comprising
a color filter substrate provided with four or more color layer portions of different colors and a light shielding layer,
each pixel including a repeating unit composed of the four or more color layer portions of different colors,
the four or more color layer portions of different colors partially overlapping the light shielding layer,
the liquid crystal display panel having a region where color layer portions of the same color in different pixels are arranged in the same rows or the same columns,
the four or more color layer portions of different colors in each pixel including a first color layer portion and a second color layer portion with lower brightness than the first color layer portion,
the color filter substrate including two directly adjacent pieces of the first color layer portion and two directly adjacent pieces of the second color layer portion,
the light shielding layer including a first light shielding portion that is positioned between the two directly adjacent pieces of the first color layer portion and a second light shielding portion that is positioned between the two directly adjacent pieces of the second color layer portion, and
in one pixel, the first color layer portion overlapping the first light shielding portion with an overlapping width smaller than that with which the second color layer portion overlaps the second light shielding portion.

2. The liquid crystal display panel according to claim 1, wherein the first color layer portion is a color layer portion of a color with the highest brightness in the pixel, and the overlapping width of the color layer portion of a color with the highest brightness is smaller than that of any other color layer portions in the pixel.

3. The liquid crystal display panel according to claim 2, wherein the overlapping widths of the color layer portions than the color layer portion of a color with the highest brightness are substantially the same in the same pixel.

4. The liquid crystal display panel according to claim 2, wherein an overlapping width of a color layer portion of a color other than the color with the highest brightness is different from that of a color layer portion of a color other than the color with the highest brightness in the pixel, and is smaller as the brightness of the color of the color layer portion increases in the pixel.

5. A liquid crystal display panel, comprising
a color filter substrate provided with four or more color layer portions of different colors and a light shielding layer,
each pixel including a repeating unit composed of the four or more color layer portions of different colors,
the four or more color layer portions of different colors partially overlapping the light shielding layer,
of two color layer portions selected from the four or more color layer portions of different colors in one pixel, a color layer portion of a color with higher brightness overlapping a portion of the light shielding layer that is positioned between the color layer portion and another color layer portion of a color with lower brightness with an overlapping width smaller than that with which the color layer portion of a color with lower brightness overlaps the portion of the light shielding layer, the color layer portion of a color with higher brightness being a color layer portion of a color with the highest brightness of the four or more color layer portions of different colors in the pixel, and the overlapping width of the color layer portion of a color with the highest brightness being smaller than that of any other color layer portions in the pixel.

6. The liquid crystal display panel according to claim 5, wherein the width of the color layer portion of a color with higher brightness in a direction toward the color layer portion of a color with lower brightness is smaller than that of the color layer portion of a color with lower brightness in a direction toward the color layer portion of a color with higher brightness.

7. The liquid crystal display panel according to claim 5, wherein the pixels are arranged in a matrix pattern, and either one of a combination of two color layer portions arranged in a row direction and a combination of two color layer portions arranged in a column direction corresponds to the two color layer portions selected from the four or more color layer portions of different colors in the pixel.

8. The liquid crystal display panel according to claim 5, wherein the pixels are arranged in a matrix pattern, and both of a combination of two color layer portions arranged in a row direction and a combination of two color layer portions arranged in a column direction correspond to the two color layer portions selected from the four or more color layer portions of different colors in the pixel.

9. The liquid crystal display panel according to claim 5, wherein the overlapping widths of the color layer portions other than the color layer portion of a color with the highest brightness are substantially the same in the pixel.

10. The liquid crystal display panel according to claim 5, wherein an overlapping width of a color layer portion of a color other than the color with the highest brightness is different from that of a color layer portion of a color other than the color with the highest brightness in the pixel, and is smaller as the brightness of the color of the color layer portion increases in the pixel.

* * * * *